US008171158B1

(12) United States Patent
Grignetti

(10) Patent No.: US 8,171,158 B1
(45) Date of Patent: May 1, 2012

(54) BROWSER SYSTEM AND METHOD

(75) Inventor: Alejandro M Grignetti, Billerica, MA (US)

(73) Assignee: Altera Corporation, San Jose, CA (US)

( * ) Notice: Subject to any disclaimer, the term of this patent is extended or adjusted under 35 U.S.C. 154(b) by 1335 days.

(21) Appl. No.: 09/818,415

(22) Filed: Mar. 27, 2001

Related U.S. Application Data

(60) Provisional application No. 60/192,609, filed on Mar. 27, 2000.

(51) Int. Cl.
*G06F 15/173* (2006.01)
(52) U.S. Cl. .................................................... 709/238
(58) Field of Classification Search .......... 709/212–216, 709/223, 231, 238
See application file for complete search history.

(56) References Cited

U.S. PATENT DOCUMENTS

| | | | |
|---|---|---|---|
| 5,703,624 A | 12/1997 | van Kruistum | |
| 5,761,485 A | 6/1998 | Munyan | |
| 5,793,957 A | 8/1998 | Kikinis et al. | |
| 5,835,732 A | 11/1998 | Kikinis et al. | |
| 5,884,323 A | 3/1999 | Hawkins et al. | |
| 5,889,888 A | 3/1999 | Marianetti, II et al. | |
| 6,151,606 A * | 11/2000 | Mendez | 707/201 |
| 6,170,074 B1 * | 1/2001 | Kondo et al. | 714/761 |
| 6,173,316 B1 | 1/2001 | De Boor et al. | |
| 6,275,746 B1 * | 8/2001 | Leatherman et al. | 700/234 |
| 6,321,231 B1 * | 11/2001 | Jebens et al. | 1/1 |
| 6,477,565 B1 * | 11/2002 | Daswani et al. | 709/217 |
| 6,671,757 B1 * | 12/2003 | Multer et al. | 710/100 |

OTHER PUBLICATIONS eBook, printed May 21, 2001, 4 pages, web page at http://www.nuvomedia.com.
eBook, printed May 21, 2001, 4 pages, web page at http://www.softbook.com.
Live Connected—The frontpath Solution, printed May 21, 2001, 3 pages, web page at http://www.frontpath.com/pro_home.htm.
$4^{th}$ Wave's Homepage, including "$4^{th}$ Wave's Information Appliance Market Report—Executive Summary", printed May 21, 2001, 10 pages, web page at http://www.fourthwave.com.

* cited by examiner

*Primary Examiner* — Hussein A. Elchanti
(74) *Attorney, Agent, or Firm* — Womble Carlyle Sandridge & Rice LLP

(57) ABSTRACT

A portable apparatus for viewing digital content received from a data communication network, includes: a non-volatile storage medium capable to store digital content received from a data communication network; a display communicatively coupled to the non-volatile storage medium and capable to display images of the digital content; a processor communicatively coupled to the non-volatile storage medium; and a content browsing engine executable by the processor and capable to select digital content stored in the non-volatile storage medium. An apparatus for receiving datacast transmission, includes: a base station including a receiver; a portable browser device capable to be coupled to the base station and including a non-volatile storage; and a filtering engine communicatively coupled to the non-volatile storage and capable to store into the non-volatile storage content bundles requested by a user, the content bundles being transmitted from a data cast transmission received by the receiver.

21 Claims, 13 Drawing Sheets

Welcome to the
*frontpath Inc*
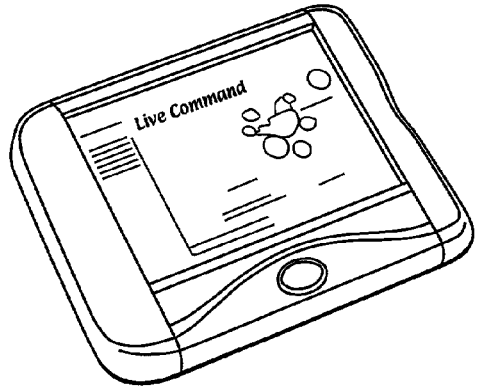
ProGear™ Demonstration home page.
Current content size: 3.67GB
Please select a content category
FIG. 7

frontpath
*Index*
| Newspapers | Magazines | WEB Sites | Documents | Photographs |
Newspapers
605
FIG. 8

frontpath
*Index*
Magazines
 ← 610
FIG. 9

frontpath
*Index*
| Newspapers | Magazines | WEB Sites | Documents | Photographs |
WEB Sites
4th WAVE™
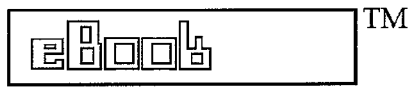
&
The EBookNet Library
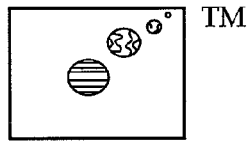
The Nine Planets
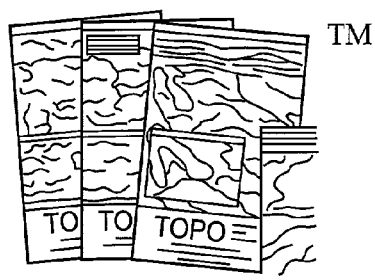
↖ 620
FIG. 10

frontpath

*Index*

| Newspapers | Magazines | WEB Sites | Documents | Photographs |

Documents

The Geek Gourmet

Tarzan: King of the Ape Men

Dave Barry in CyberSpace

Scott Adams: Secrets of Management

CGI Scripting: Quick Start

The Holy Bible: King James Version

Beatles Album Lyrics

Full Linux Documentation

Micro Touch Documentation

Cyrix MediaGx Documentation

Cell Computing Documentation

The Linux Command Reference

The W3C HTML 4.0 Specification

9 RevolutionIV Technical Specification

Learning PERL     ↖ 630

PERL in Ten Minutes

FIG. 11

BROWSER SYSTEM AND METHOD

CROSS-REFERENCE TO RELATED APPLICATION

This application claims priority to U.S. Provisional Application No. 60/192,609, by common inventor, Sandro (Alejandro) Grignetti, filed Mar. 27, 2000, and entitled "BROWSER SYSTEM AND METHOD". Application No. 60/192,609 is fully incorporated herein by reference.

TECHNICAL FIELD

This disclosure relates to Internet appliances, and more particularly but not exclusively, to portable Internet browser devices that do not require connection to the Internet in order to display Internet content.

BACKGROUND

Current devices for reading digital content include WebPAD style devices, electronic books, set top boxes, WEB enabled cell phones, Personal Digital Assistants (PDAs), palmtops, and laptop and desktop PC (Personal Computing) devices. WebPAD style devices are typically tethered to a base station via radio frequency (RF), have limited or no data storage capability (usually less than approximately 64 Megabytes (MB)), use proprietary operating systems (e.g., QNX, VxWorks, WinCE), and have limited battery life (typically less than approximately 3 hours). Additionally, WebPAD style devices are not 100% Internet compliant, since these devices typically offer no support for the following: (1) Macromedia ShockWave or Flash, (2) Multi-media support (QuickTime, .AVI, Real Audio/Video, and the like), and (3) JAVA, JavaScript, and Virtual Reality Modeling Language (VRML) and other "Plug-ins". As known to those skilled in the art, a plug-in is a helper application used by browsers to facilitate the viewing of certain file types, or content. WebPAD style devices also have limited or no viewers for .pdf, .doc, .xls, .ppt, type files, and the like.

Electronic books are limited to a single function and have no general Internet access capability. This single function uses only one data format type, and this is generally a proprietary format. Furthermore, electronic books have the limitation of being necessarily linked to an associated proprietary content database (in order to facilitate copyright protection).

Set top boxes, such as those provided by WebTV, require a wired Internet connection in order for Internet content to be viewed in the set top box. Furthermore, set top boxes are not designed to be portable devices, and offer a very limited visual experience due to the low resolution of a television set, and the manner in which the television image is drawn on the screen (i.e., interlaced format reduces resolution further).

WEB enabled cell phones offer a very small screen, forcing WEB content to be reduced and heavily re-formatted in order to fit the smaller form-factor. Web enabled Cell phones are also not 100% Internet compliant, by having support only for text.

Palmtop devices are generally not X86 processor based (the Intel 80x86 range, or compatibles from, e.g., Cyrix or Advanced Micro Devices), making them incompatible with existing plug-ins for viewing Internet content. Furthermore, palmtop devices generally use the proprietary operating system, WinCE, which has poor World Wide Web (WEB) browser support. As known to those skilled in the art, a browser is an application program that provides a method to look at and interact with information contained on the WEB. The WEB browser is typically a client program that uses Hypertext Transfer Protocol (HTTP) that enables the browser user to make requests to WEB servers connected to the Internet. Two conventional WEB browsers that are widely used today are the Netscape Navigator and the Microsoft Internet Explorer.

Personal computers are often used for reading Internet content, but they can be expensive, and non-intuitive or complicated for the non-computer user. Additionally, personal computers are large in size, heavy in weight, non-portable, typically expensive, and may not provide reading comfort for some users. Personal computers are also slow in operation, since they require time to "boot up" during system start up or system reset, and since they typically are processing multiple applications. Additionally, it is time consuming for personal computer users to access the Internet and perform browsing operations, particularly when the WEB server in the Internet that they wish to access is busy or when network failure occurs.

Current methods for browsing Internet content require the existence of a continuous connection to the Internet. This connection forms a physical link between the device and the Internet, which limits the portability of the browsing experience. In the future, when high bandwidth cellular telephone data access is available, the ability to sustain a more portable connection will be possible. But even in these circumstances, sustaining a continuous connection to the Internet will result in a high price. There will still be a need to mitigate these prices even when Internet access is nearly ubiquitous.

Thus, there is a need for an apparatus and method that will overcome the above-mentioned deficiencies of conventional methods and systems. There is also a need for a portable apparatus and method to view Internet content. There is also a need for a portable apparatus and method that will permit a user to view and browse through Internet content at a faster speed and without the requirement of a continuous connection to the Internet. There is also a need for a portable apparatus and method that will permit a user to conveniently view and browse through Internet content at any time and anywhere. There is also a need for a portable apparatus and method that will allow caching of content to minimize connection times. There is also a need for a portable apparatus and method that will permit a user to view and browse through Internet content in a convenient manner and with less difficulty. There is also a need for an inexpensive and easy-to-manufacture apparatus for permitting a user to view and browse through Internet content.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 7 is a screen shot of the main contents page that shows an index of links to the different content categories.

FIG. 8 is a screen shot of a page showing the contents in the newspapers category.

FIG. 9 is screen shot of a page showing the contents in the magazines category.

FIG. 10 is a screen shot of a page showing the contents in the WEB sites category.

FIG. 11 is a screen shot of a page showing the contents in the Documents category 630.

DETAILED DESCRIPTION OF THE ILLUSTRATED EMBODIMENTS

Figure 1:
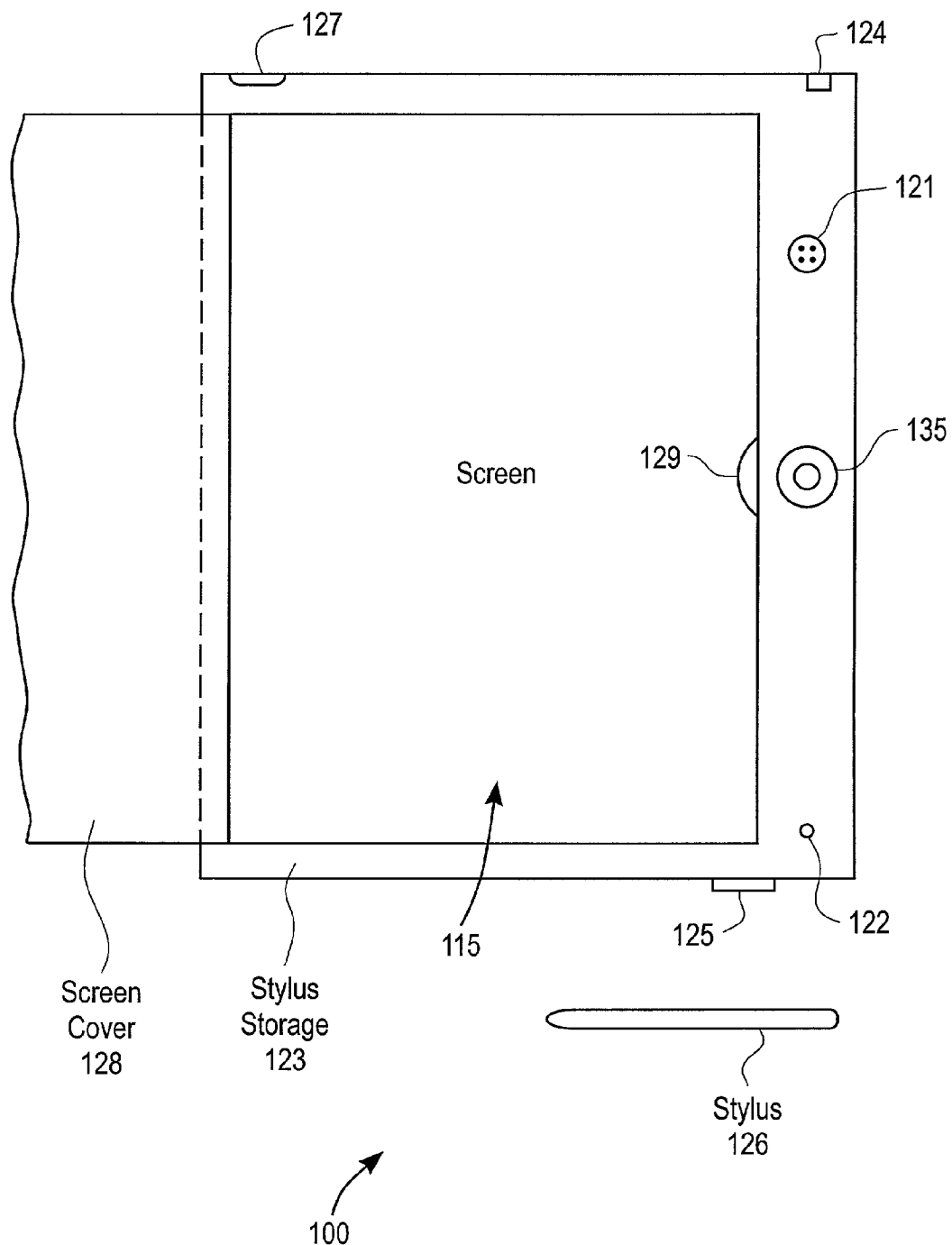
FIG. 1 is a block diagram of a portable peripheral browser device according to an embodiment of the invention.

Embodiments of a method and system to provide a portable browsing device for viewing content received from the Internet without requiring the browser device to be connected to the Internet during the viewing of the content are described herein. As an overview, an embodiment of the invention provides a portable browser device including: a touch sensitive LCD screen capable to display images of Internet content, a non-volatile storage medium coupled to the processor and capable to store content received from a data communication network such as the Internet, a content browsing software, a processor capable to execute the content browsing software, a battery pack to power the device, an I/O port and an ergonomically designed enclosure to house all of these components in a portable form factor.

The present invention may advantageously provide a system and method for enabling users to more conveniently view Internet content at any time, in any place or in any manner and for enabling users to access and browse Internet content at a faster speed. The present invention may also advantageously provide a browser device that is portable and that can be used to display Internet content without requiring the browser device to be connected to the Internet during the viewing of the Internet content. The present invention may also advantageously provide a browser device that is smaller in size, lighter in weight, lesser in cost, has reduced design/production complexity, and has less maintenance requirements as compared to conventional Personal Computing devices. The present invention may also advantageously minimize the amount of software required for Internet Browsing, and this feature minimizes the number of commands required from the user to operate the browser device. Thus, the present invention may provide a browser device that is easy to use even for non-computer users. The present invention may also advantageously provide a browser device that can download and store for viewing a large amount and wide variety of digital content such as, for example, WEB Sites, periodicals such as "The Wall Street Journal" or "Time", digital photographs, documents, multimedia (e.g., movies), music, and the like.

In the description herein, numerous specific details are provided, such as the description of system components and software, to provide a thorough understanding of embodiments of the invention. One skilled in the relevant art will recognize, however, that the invention can be practiced without one or more of the specific details, or with other methods, components, materials, parts, and the like. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 is a block diagram of a portable peripheral browser device 100 in accordance with an embodiment of the present invention. In one embodiment, the peripheral browser device 100 is the device known as the ProGear™, which is available from frontpath Incorporated, 2841 Mission College Boulevard, Santa Clara, Calif. 95054. The peripheral browser device 100 is typically small in size (e.g., approximately ½ inch in thickness and approximately 8 inches by 10 inches in surface area), light in weight (e.g., approximately 2 pounds), and portable.

In one embodiment, the peripheral browser device 100 is configured to display digital content on a screen 115 in portrait mode by default, but landscape mode is possible as well. Portrait mode is similar to standard paper and book format, and was chosen to reduce the amount of scrolling that is required while reading content. For example, the digital content may be hypertext markup language (HTML) and/or JAVA content that was previously downloaded from a data communication network such as the Internet and is stored in an on-board non-volatile storage 120. The digital content stored in the non-volatile storage 120 may also be any other type of digital content that was previously downloaded from a data communication network. It is noted that the Internet is chosen as an example of a data communication network in this disclosure because it is a well-established network, and connectivity to the Internet is easily made. However, it is noted that a global communication network, such as the Internet, is not required to practice other embodiments of the invention. The digital content that is stored in the on-board non-volatile storage 120 may be downloaded from other types of data communication network such as, for example, a locally provided and maintained communication network.

As an example, the screen 115 comprises a liquid crystal display (LCD) panel 115a (FIG. 4) with a screen size of approximately 10.4 inches and a screen resolution of 1024 by 768. Other screen sizes and resolution values may also be used for the screen 115. The display technology may also vary for screen 115. For example, thin film transistor (TFT) LCDs (i.e., active matrix displays) or super twisted nematic (STN, or passive matrix) displays may be used as the display technology for screen 115. Bi-stable LCD displays, such as electronic ink (Eink), which have less power requirements, may also be used for the display technology for screen 115, as could Organic Light Emitting Diodes (OLEDs), or Light Emitting Polymers (LEPs).

Figure 4:
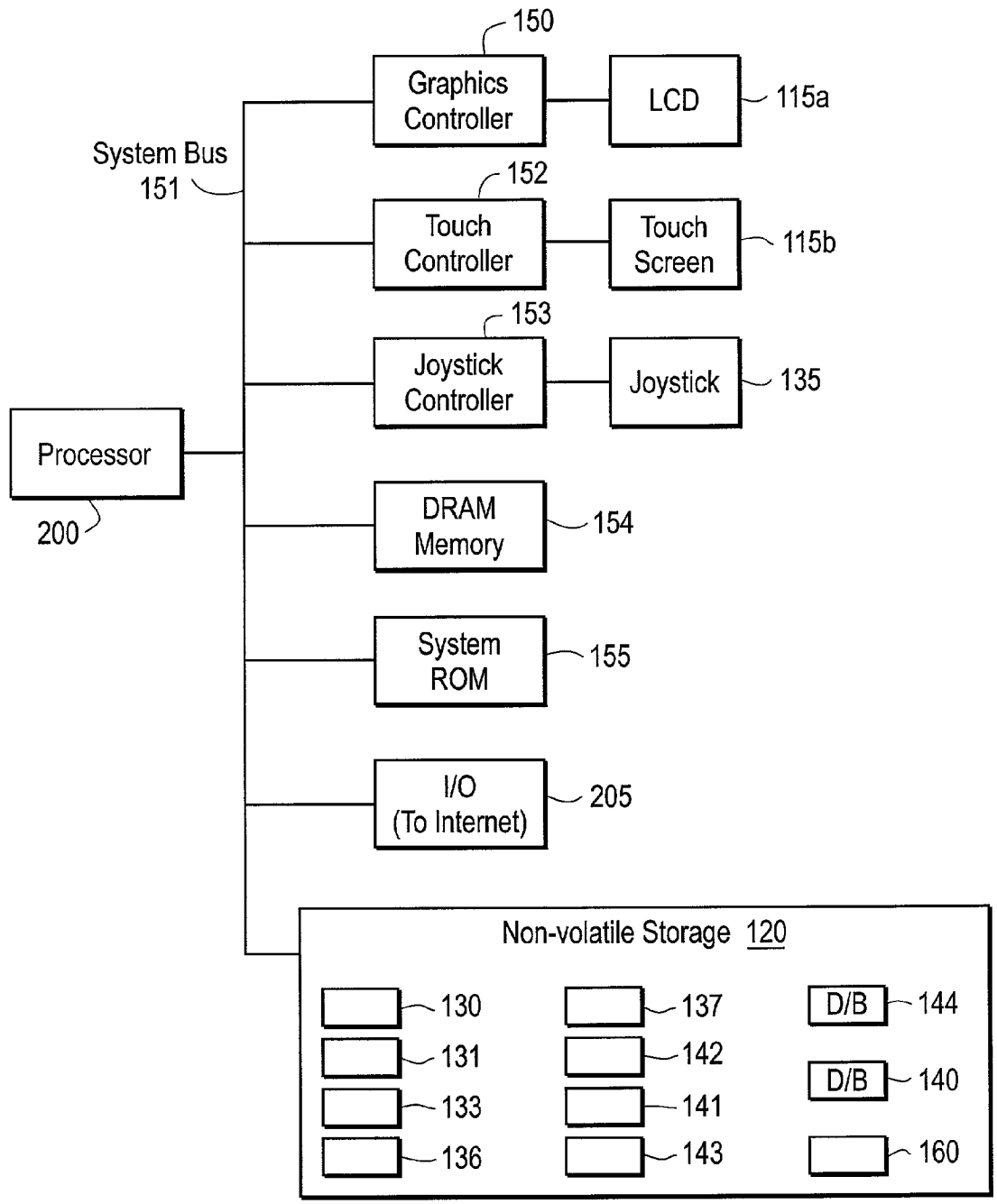
FIG. 4 is a block diagram of the system components in the browser device of FIG. 1.

In one embodiment, the screen 115 includes a four or five wire resistive touchscreen 115b (FIG. 4). A power button 125 is used for turning the peripheral browser device 100 on or off. A multifunction joystick 135 is used for accessing a menu which allows access to all functionalities in the peripheral browser device 100, as well as permitting the user to perform scrolling functions (scrolling up, down, left, and right functions) on screen 115. The joystick 135 can be in any suitable compact configuration that permits ease of use for the user. A stylus 126 permits fine touch access to screen contents too small for finger selection. A DC input jack 127 provides connection to a DC power source (not shown) for recharging a battery in the browser device 100 and permits transmission of power into the browser device 100 when battery power is low. The device 100 also includes a cover 128 to protect the LCD panel/touch screen during storage, and also has a switch (cover sensor 129) to turn the browser device 100 off when the cover 128 is closed (i.e., when the cover 128 is inserted into the cover latch). Other features that may be included in the browser device 100 includes, for example, a speaker 121, microphone 122, stylus storage area 123, and/or earphone jack 124.

Figure 2:
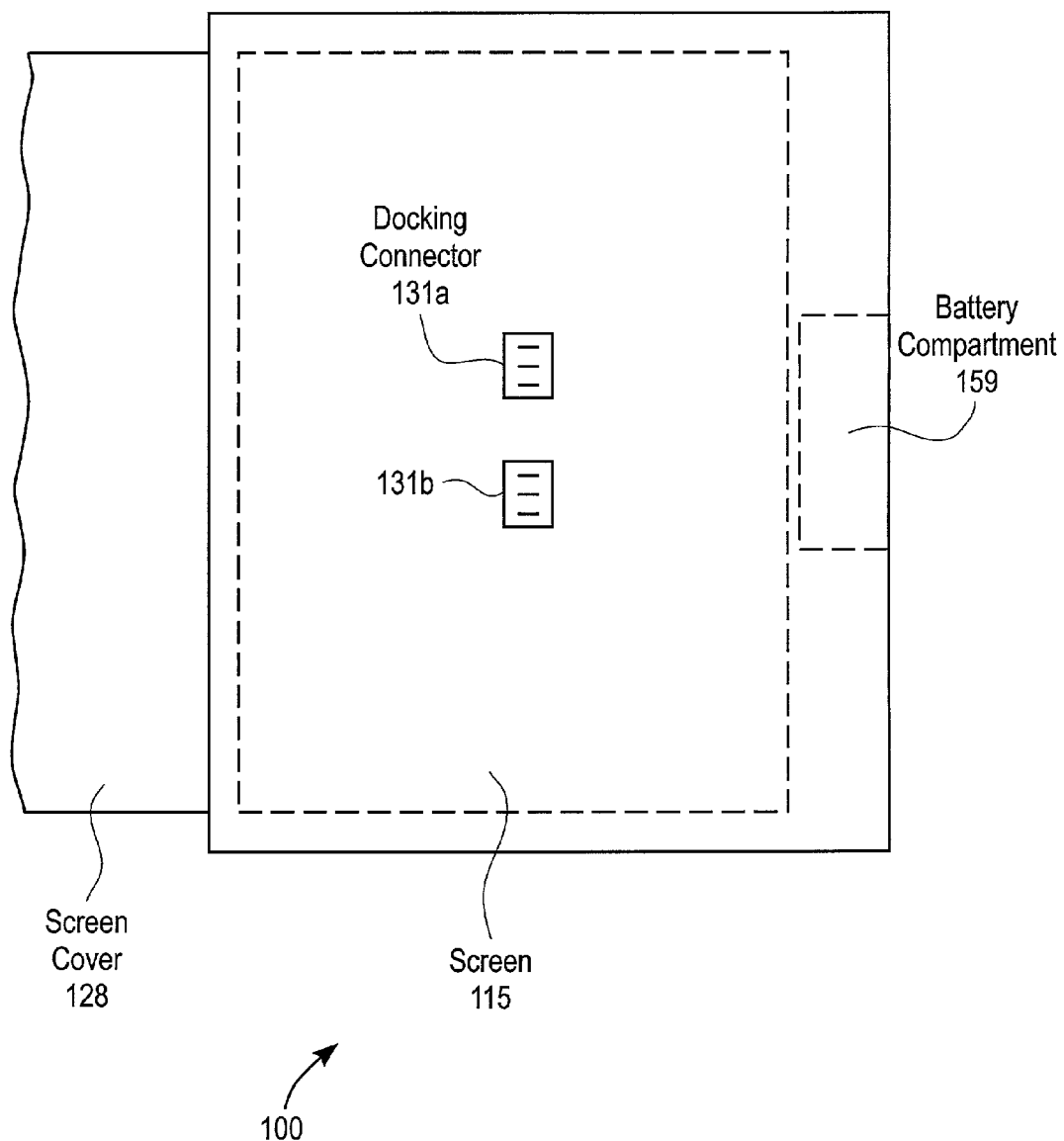
FIG. 2 is a block diagram of the bottom view of the browser device 100.

FIG. 2 is a block diagram of the bottom view of the browser device 100. Docking connectors 131a and 131b permits the browser device 100 to be connected to, for example, a cradle 207 (FIG. 3), base station 1315 (FIG. 13) or other suitable docking stations. A battery compartment 159 in browser device 100 may house a suitable power source such as a battery.

In one embodiment, the browser device 100 will only run a single application, an Internet browser 130 (see FIG. 4). This application 130 is automatically loaded when the system of browser device 100 initializes, and there is no technique of closing this application 100 during normal operation of the browser device 100. The browser device 100 functions like a hardware Internet browser, and not like a typical PC that runs many applications. There is no "Desktop" to be viewed.

Figure 5:
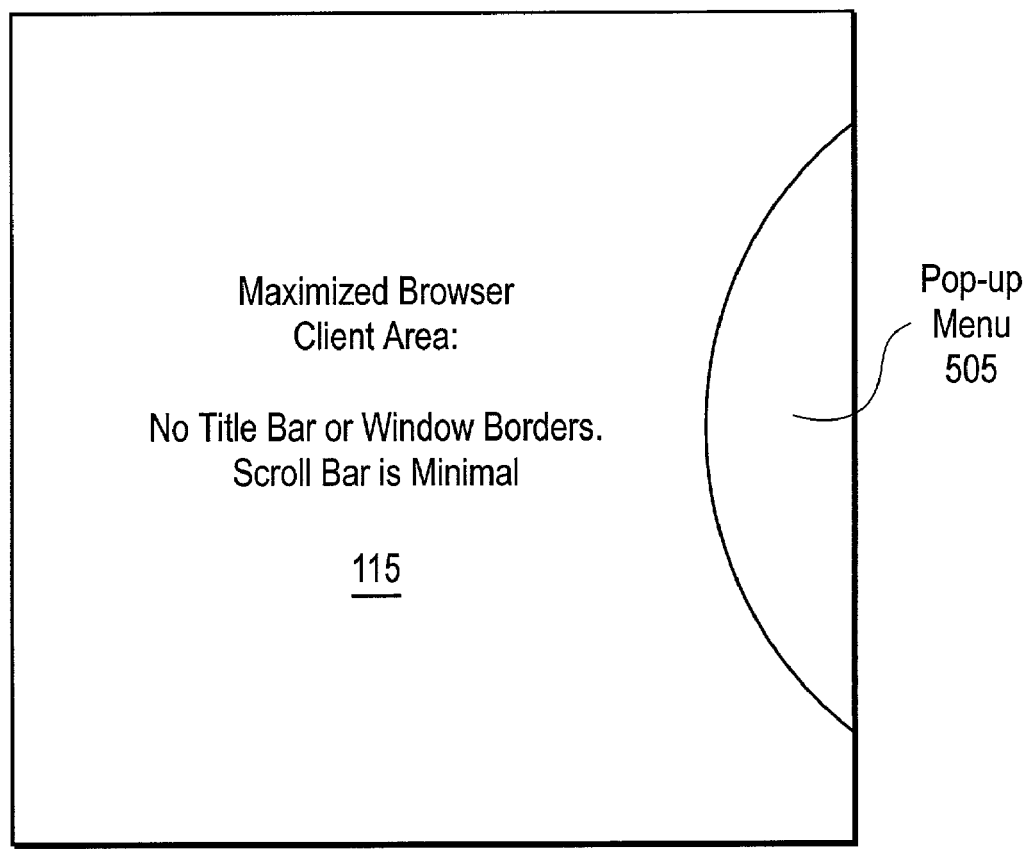
FIG. 5 is a block diagram of the maximized screen area in the browser device.

In one embodiment, the client area 500 in screen 115 is maximized so that the space per content to be shown on screen 115 is maximized (see FIG. 5). The client area 500 is maximized by the use of, for example, no menu bar, no title bar, and no window borders. A minimal scroll bar is used for visual aide only, to show location within a document. A menu 505 (FIG. 5) can be brought up with the use of the multi function joystick device 135 (FIG. 1). The only application that the user sees on the screen 115 is the client window of the browser 150 (FIG. 4), and, as a result, the screen 115 advantageously has maximum space leftover for displaying Internet content.

When disconnected from an Internet connection, the peripheral browser device 100 performs the browsing functions that are similarly performed by an Internet WEB browser, except that the peripheral browser device 100 accesses digital content stored in non-volatile storage 120 in order to display digital content on screen 115. The digital content stored in non-volatile storage 120 was previously downloaded from the Internet. The non-volatile storage 120 is, for example, a hard disk drive. However, other types of storage devices, such as Micro Drives available from, for example, International Business Machines Corporation, Compact Flash, or Magnetic Random Access Memory (MRAM) may also be used for the non-volatile storage 120. The non-volatile storage 120 preferably has sufficient size so that it can store WEB sites, documents, electronic magazines, or other types of periodicals or digital content. For example, the size of non-volatile storage 120 can be approximately 340 to 1000 megabytes. Therefore, the peripheral browser device 100 advantageously permits a user to view and browse through Internet content stored in non-volatile storage 120, at any time and any where, without requiring a connection to the Internet when the user is viewing the Internet content.

The peripheral browser device 100 is typically an accessory device that can be used with a host-processing device 209 such as a desktop personal computer. The host-processing device is used for connection to the Internet and for permitting a user to performing printing commands or archiving functions. Thus, the user can direct the host-processing device to download (or electronically store or "print") Internet content to non-volatile storage 120 of peripheral browser device 100, instead of conventionally printing the Internet content in a paper printing device.

Alternatively, instead of being connected to a host processor 209, the peripheral browser device 100 can be connected directly to the Internet via an analog or digital modem so that Internet content can be downloaded to the non-volatile storage 120. The device can also be configured to use a standard network or a RF (Radio Frequency) network connection to access the Internet for content.

The peripheral browser device 100 may advantageously provide an advancement in the field of electronic publishing by facilitating the viewing and consumption of content without the need for traditional paper based printing of the content. Electronic subscription copies of periodicals, such as newspapers and/or magazines or other files, can be downloaded from the Internet to the peripheral browser device 100. Alternatively, electronic subscription copies of books or other files may have been received in the host-processing device via e-mail, and these electronic copies can then be downloaded to the peripheral browser device 100. Additionally, various other types of digital content can be downloaded to and/or stored in the non-volatile storage 120 of the peripheral browser device 100 and viewed by the user on the screen 115. For example, the user can store and view digital photographs, digital documents, and/or other digital content. Commuters, travelers, and readers can greatly benefit by using the peripheral browser device 100 because of its portability. By use of the peripheral browser device 100, such persons will be able to download, store, browse through, and/or read digital content from the Internet, at any time and anywhere and without the constraint of requiring an Internet connection while viewing such digital content.

The peripheral browser device 100 may also be beneficial in liar the area of education. Recent studies have shown that use of laptop or notebook computers in the classrooms can improve the learning process for students. The peripheral browser device 100 can offer many of the advantages of a laptop or notebook computer for educational purposes, but at a reduced cost. For example, classroom teaching materials can be designed as HTML documents with JAVA content. These teaching materials can be designed for teaching students as well as for monitoring the progress of students in the classroom or at home. In particular, reference books, text books, lessons, classroom or homework assignments, and/or exams can be downloaded to the peripheral browser device 100 from a teacher's desktop computer. The students can then access these downloaded materials in the peripheral browser devices 100, whether the students are in classroom or at home. Teachers will benefit from the improved ability to tailor their educational materials for each student. A student benefits by having just one peripheral browser device that can be used for all his/her courses and textbooks so that there is no need for him/her to carry multiple heavy books between classes. Additionally, students can reduce the cost of books for their courses.

The peripheral browser device 100 is also beneficial for publishers and for subscribers. Users can now have available in their peripheral browser devices 100 their favorite subscriptions of magazines, newspapers, and/or other periodicals which have been downloaded and stored in non-volatile storage 120 of the peripheral browser device 100. The electronic publishing feature enabled by the peripheral browser device 100 permits publishers to reduce or eliminate costs in paper printing/publishing and in distribution, without negatively impacting the readership of the periodicals or the value of the advertisements in the periodicals. Indeed, advertisements can be made even more compelling to the reader because of the ability to combine traditional print based advertising with television style multimedia advertising, and with Internet based (targeted) advertising, a concept hereinafter called "Deep Advertising".

Other advantageous uses for the peripheral browser device 100 may include the following: a photo album for storing and viewing picture images, a coffee table book, a simple game machine, an electronic substitute for paper in the office or for hand-outs in seminars, an Internet shopping catalog, a global positioning system (GPS) guided map, a reference for technicians or engineers building or designing complicated structures or devices (e.g., airplanes by the Boeing Company), a digital notepad and reference guide for doctors in hospital settings, a device for storing an electronic copy of books or pamphlets, and numerous other uses and applications.

Other particular advantages of the peripheral browser device 100 include its reduced size, weight, and design/manufacturing complexity, and its improved portability and ease of use, as compared to conventional computers.

In one embodiment, the browser device 100 is an Instant-On device. Instant-On is an established method of implementing a system that initializes "instantly", by effectively minimizing power consumption in a pseudo off state. When the system is turned off, the system of device 100 merely goes into an extremely low power state that maintains the state of DRAM. This DRAM state, is known as self refresh mode, and as known to those skilled in the art, self refresh DRAM memory is widely available. When the user turns the system back on, the system is already initialized, and needs to merely restore power to system components to achieve full functionality. By allowing the system to initialize instantly, the browser device 100 is more accessible to users.

FIG. 4 is a block diagram illustrating the important components of the peripheral browser device 100. Additionally, some or all of various components shown in FIG. 4 may be integrated in an application specific integrated circuit (ASIC) or field programmable gate array (FPGA) to help reduce cost and lessen manufacturing difficulties. Other types of assemblies and manufacturing techniques may also be used for assembling the components shown in FIG. 4.

A processor 200 performs the control functions of the peripheral browser device 100. The LCD display screen 115a will 15: show the contents of the non-volatile storage (Internet content) and the touch screen 115b will allow navigation of the content similarly to a conventional PC, in that selection of hypertext links accomplishes movement within the stored content. The processor 100 runs an Operating System 131 and the Internet browser (content browser engine) 130, and associated peripheral applications or helper applications 133 that the browser 130 may require while decoding WEB pages. The browser device 100 is configured to run just the browser application 130, such that it is not possible to shut down the browser application 130 to get to a "desktop" state. The browser 130 can, as needed, call upon helper applications (helper engines) 132 to assist in the decoding of certain types of Internet content.

When the peripheral browser device 100 is connected to a host-processing device 209 such as a computer, the following unique functions are also advantageously permissible. A device driver 210 resident in the host computer 209 permits the peripheral browser device 100 to be seen as an optional printing device in that computer 209. This allows users of the host-processing device 209 to "print" any content to the peripheral browser device 100 that would otherwise be printed on a paper if a conventional printer device were used instead. When printing to the peripheral browser device 100, the user simply selects the peripheral browser device 100 from the list of available printer devices, and the host processor resident device driver 210 converts the selected document into HTML format for subsequent download to the peripheral browser device 100. This, in effect, makes the peripheral browser device 100 a host processor compatible printer.

The peripheral browser device 100 can also advantageously function as a "computer doubler" when the peripheral browser device 100 is connected to the host processing device 209. For example, the user can use the peripheral browser device 100 to surf the World Wide Web by use of a connection (via the host processing device 209) to the Internet, while a second user can simultaneously use the host-processing device 209 for other tasks such as playing a computer video game or performing word processing. This is accomplished by a device driver 211 in the host processing device 209 where the device driver that routes Transmission Control Protocol/Internet Protocol (TCP/IP) requests from the peripheral browser device 100 to the established Internet connection, with minimal host CPU overhead. In typical multitasking operating systems (such as with Microsoft Windows) the CPU overhead required for servicing TCP/IP handoff such as the above is so small as to allow nearly transparent processing of the TCP/IP requests, while devoting the majority of the CPU to the other processes that the host CPU may be performing.

Additionally, the peripheral browser device 100 permits the scheduled downloads of digital content from the Internet during specified time periods. For example, the digital content from the Internet may be downloaded at night to the non-volatile storage 120, and the user may conveniently view the downloaded content or browse through the downloaded files the following day. This is accomplished by using a helper application 133 on the peripheral browser device 100, and a device driver 212 on the host-processing device 209. The helper application 133 on the peripheral browser device 100 will wake the peripheral browser device 100 at the specified time, and begin making download requests from the Internet connection. Content that had previously been marked for download or refresh by the user would be requested at this time. The host processing device driver 212 will take these requests from the helper application 133 and route them as if a user were making the download requests directly from the host processing device 209. The host resident device driver 212 makes no distinction between user requests made directly from the host processing device 209 or unattended automatic requests sent from the helper application 133.

Figure 3:
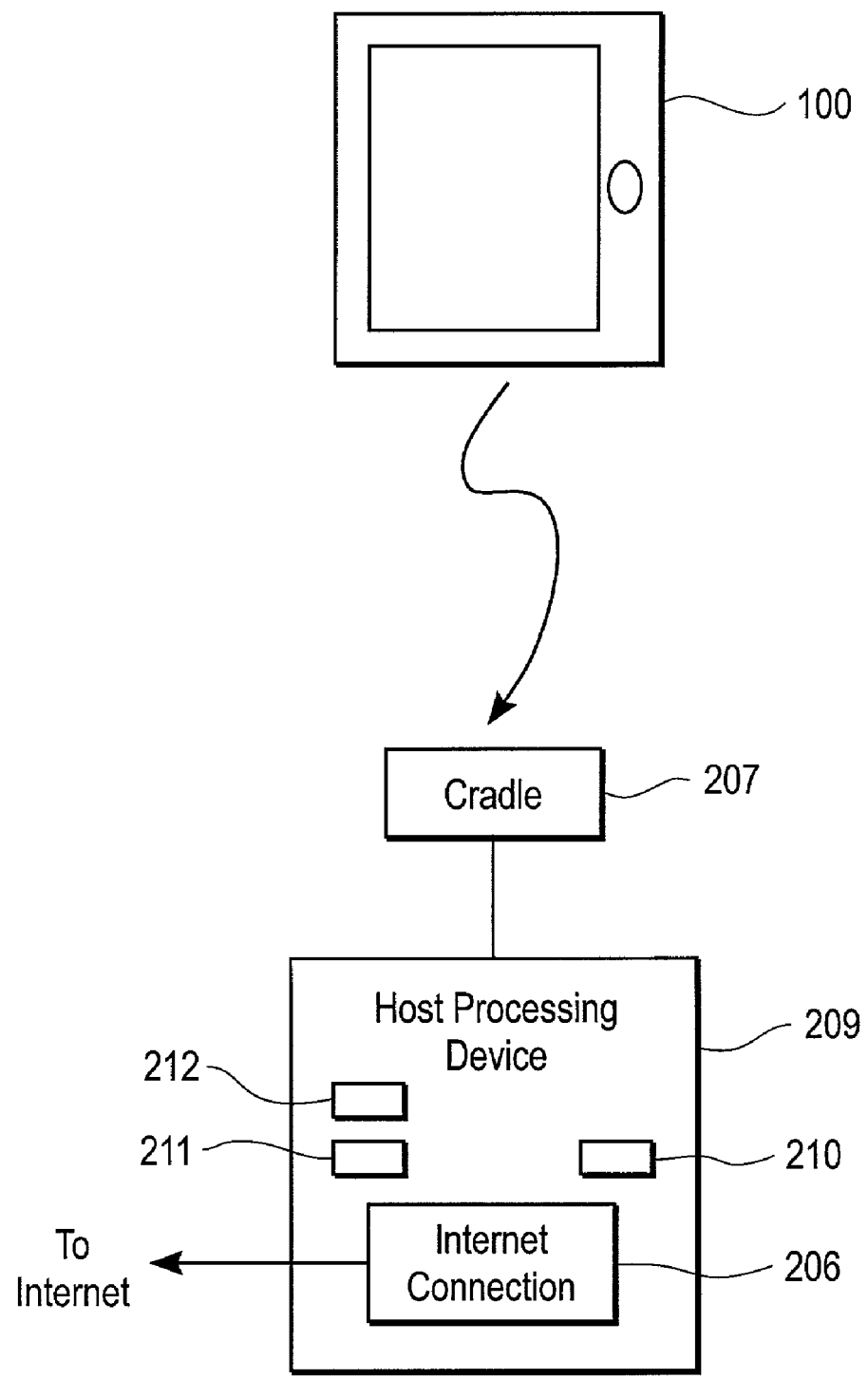
FIG. 3 is a block diagram showing the browser device for connection to a cradle and to the Internet.

The input/output (I/O) port 205 permits the peripheral browser device 100 to be connected to an Internet connection 206 (FIG. 3). This Internet connection 206 may be, for example, through a host computer, a network, or a modem. A physical network connection may be through Ethernet, Radio Frequency (RF), or Universal Serial Bus (USB).

The peripheral browser device 100 is powered by a power source that is, for example, a battery pack. The power source is recharged when the peripheral browser device 100 is connected to an AC/DC converter, or when the peripheral browser device is placed in its base station (or cradle) 207 (FIG. 3).

In one embodiment, the system components are all stored in a special closed area of the non-volatile storage 120. The system components include, the operating system 131, the browser 130, a server 136, device drivers 160, and helper applications 133. The system components are typically implemented as software (i.e., programs, instructions, modules, engines or the like). The operating system 131 may be, for example, the Linux operating system. The browser 130 may be, for example, a Netscape (or Mozilla) browser. As known to those skilled in the art, Mozilla is a public domain WEB Browser. The source code to Mozilla is available for modification, free of charge. Modification of this browser source code allows one skilled in the art to incorporate some of the functionality of a WEB server into the Mozilla browser code base, and this reduces the overall size of the software package.

The WEB server 136 controls or filters the TCP/IP packets between the browser 130 of the peripheral browser device 100 and the Internet content (either in non-volatile storage 120, or on the "live" Internet). The server 136 launches appropriate helper applications 133, and selects the location of content, either locally from non-volatile storage 120, or from the Internet. Because the peripheral browser device 100 is designed primarily for offline browsing, the server is placed in the off-line mode (reFpg,questing content from the non-volatile storage 120) by default. When a refresh or update is requested (either by the user, or by the auto update utility), the server 136 is switched to live content mode, where content is requested from the Internet connected to the I/O port. The user may also select a live connection for browsing as well, if, for example, an RF link to the Internet is present continuously. This mode of operation can then allow the peripheral browser device 100 to function as a live wireless browser of Internet content.

The browser 130 may also include plug-ins to assist in the viewing of files that are not in HTML format. These files may, for example, be Acrobat files (.pdf), photographs (.jpg, .gif, .tiff, .bmp), multimedia (RealAudio/Video, QuickTime, MPEG) or sound (.wav, or .MP3). The plug-ins are similar to helper applications 133, in that the plug-ins allow the browser 130 to view files that are not .html format. Plug-ins differ from other helper applications in that the plug-ins use a preferred communication to the browser 130 allowing the plug-in to function from within the browser. In some instances, this is preferred, when, for example, a .pdf file may be viewed from within the browser 130 window, rather than in a separate application window. However, the added work of that level of integration is not always justified, so the peripheral browser device 100 has both types of helper applications in one embodiment.

Other elements in the system shown in FIG. 4 are also now described. A graphics controller 150 handles the formation of graphic elements on the LCD 115a. The graphics controller 150 communicates with the operating system 131, and takes the drawing commands from the browser application 130 and converts them to pixels on the LCD 115a. The touch controller 152 converts the analog signals of the touch screen 115b into digital point coordinates used by the operating system 131 as user (or mouse) input. The joystick controller 153 converts the analog signals of the joystick 135 into digital commands for the operating system 131 to interpret as user commands (such as scrolling). The device 100 subsystems are started by the ROM BIOS software, which initializes all hardware (HW) components, and then loads the operating system 131 to the DRAM memory 154. The processor 200 and operating system 131 then begin executing programs, such as the browser application 130, to make the device 100 perform its functions. The DRAM memory 154 is where the processor 200 executes all software instructions. As known to those skilled in the art, processors require software to perform any functions, and this software requires memory to execute within. The system bus 151 is the primary avenue for communications of all devices with the DRAM memory and the processor. The non-volatile storage 120 has a closed area within it to store all system software. The operating system 131, the browser application 130, and all helper applications 133, and device drivers 160 are placed here for permanent storage.

Content Pointer Database

The peripheral browser device 100 obtains content from the Internet. This content is downloaded to the browser device 100 by use of an automated download utility 137. The automated download utility 137 has preset content starting points that are simply hyperlinks (similar to the links stored in a Bookmark or favorites file), and uses general instructions to download certain depths of content from the user selected sites in the Internet. These general instructions (which have variables that control it, and that are set by the user) control the manner in which a WEB site is traversed and copied to the local non-volatile storage 120 for caching. Starting from an initial web page, the program will download all web pages that are referenced within that initial web page. The program will also translate all links in the web page, from absolute Internet addresses, to relative file system type addresses. For example, a file residing on the Internet, and having a link to the absolute address HTTP://www.frontpath.com/progear.html, will have the link translated to FILE:///c:/webcontent/www.frontpath.com/progear.html. As links are traversed, copied and translated, the automated download utility program 137 will count the depth of sites (depth is a representation of how many links deep the program will traverse. If the program is set to traverse to a depth of 2 links deep, a web page has two links, each of which has two links, will result in a total of 4 web pages being stored).

The automated download utility 137 will cache in non-volatile storage 120 all of the requested content, and make entries in the content pointer database 140 to indicate appropriate information about each downloaded WEB site. The information recorded includes, for example, the starting point location of the content within the non-volatile storage 120, the date and time of the download of the content, any associated icons that represent the downloaded content visually, and an indication of the size of the downloaded content pointed to by the start link. Also included in the database entry is a linked list of all disk sectors and file names that the link tree created to build that download (all sites traversed, however many links deep it went). This last entry facilitates the removal of content when disk-reuse (described below) is initiated.

Inevitably, however, the auto download utility will download content that was not required, or it will not download critical content, since it is impossible for a remote program to understand the content. This is due to the fact that a simple depth variable is insufficient to understand the format of every article written. For example, some publishers may wish to get as much advertising into an article as possible, so a 10 page article may be divided into 20 linked pages, each with a different advertisement. Other publishers, if they are subscription rather than advertising based, may place the article on a single long web page, to facilitate reading. A simple program cannot take the two scenarios into account; therefore the concept of content bundles is introduced. Content bundles are to the web, what books, newspapers and magazines are to paper: groups of like content bound together in one package. Content bundles are groups of self-referencing web pages that are put together by the publisher of that content, and then compressed for ease of delivery. The content bundles solve the problem of incomplete or extra content created by the automatic download utility 137. The content bundle represents a complete image of a magazine, or newspaper of even a web-based catalog (or any web based content), all wrapped up neatly into an easy to deliver bundle. Content bundles can also be downloaded by the automatic download utility 137; they simply do not require any depth control (a content bundle is one link deep).

Figure 6:
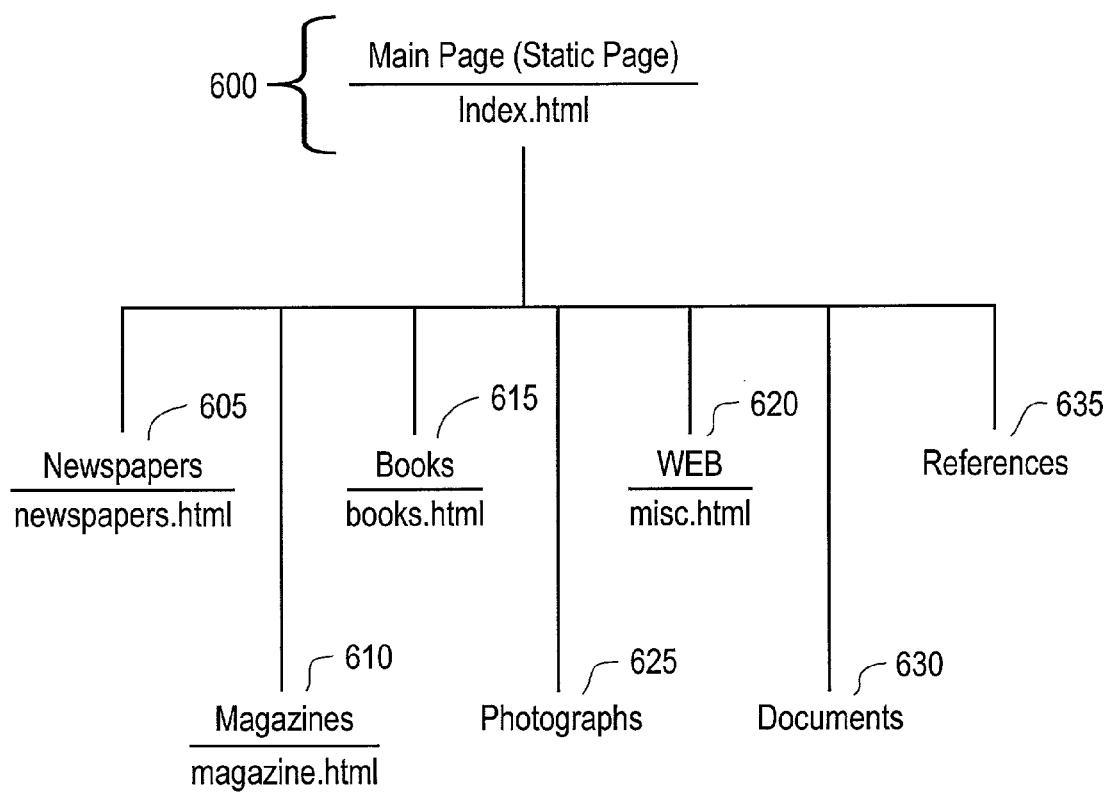
FIG. 6 is a block diagram of the Index structure in the browser device.

The peripheral browser device 100 accesses all stored content by use of the main contents page 600 (index.html in FIG. 6). This main contents page 600 is a list of pre-formatted links and icons that link the user to automatically generated pages for each content type. These Content categories are general groups of content bound by a particular source type.

Initial content types may be, for example, Newspapers 605, Magazines 610, Books 615, WEB sites 620, Photographs 625, Documents 630, and Reference 635. These are static names for dynamic pages created during content loading from the content pointer database. These content types are displayed in the default start-up page (i.e., the main contents page 600) for the peripheral browser device 100.

FIG. 7 is a screen shot view of the main contents page 600 that shows an index of links to the different content categories such as newspapers 605, magazines 610, WEB sites 620, documents 630, and photographs 625. When an individual content category is selected, all content of that type is arranged on a page for selection by the user. This page is created by a Common Gateway Interface (CGI) script that reads the content pointer database 140 and arranges start points from the database 140 into a WEB page of links for that content type. The CGI script only creates the page in response to a change in the content database 140, so static content will not cause a regeneration of the, for example, books page, unless there are recent downloads of the book content type. These web pages are inter-linked to allow simple forwards and backwards browsing among the content categories (as shown in the figures). Selection of particular content will cause the browser 130 to jump to the location of that content on the non-volatile storage 120, and subsequent links come from the tree of content that that particular content has stored in non-volatile storage 120. Any content that has been placed in non-volatile storage 120 in content bundle format runs through the added step of on-the-fly decompression prior to display, so as to keep the content in compressed form. As known to those skilled in the art, a CGI script is a small program that runs on an application that is executed by an HTTP server machine in response to a request by a client, such as a WEB browser.

FIG. 8 is a page screen shot showing the contents in the newspapers category 605. For example, the contents include links to the Boston Globe™, Washington Post™, and the Mercury Center of the San Jose Mercury News™.

FIG. 9 is page screen shot showing the contents in the magazines category 610. For example, the contents include links to the Time™, PC Magazine™, PC Computing™, and other links.

FIG. 10 is a page screen shot showing the contents in the WEB sites category 620. For example, the contents include links to the WEB sites of "4$^{th}$ Wave™," "The Nine Planets™," and other WEB site links.

FIG. 11 is a page screen shot showing the contents in the Documents category 630. For example, the contents include links to "The Geek Gourmet," "Beatles Album Lyrics," and other documents and electronic books.

The content pointer database 140 is a simple database containing entries for each type of content stored in the non-volatile storage 120. In one embodiment, the content pointer database 140 is an area in memory of the non-volatile storage 120. These entries contain information regarding the location and usage of a content. The content pointer database is created and updated by the auto download utility application that places content in non-volatile storage 120. The database 140 contains one entry for each content start point, not for each individual piece of content. Additionally, the database 140 contains a linked list of all the files that comprise that content tree, for use in helping to clean the disk after the content is selected for removal. There are certain properties that can be given to pieces of content within any content type, or below any start point, which can cause the creation of different and new content pointers in the database. Precious content identifies content that is not allowed to be erased unless explicitly directed by the user. Precious content is designated by the user in certain categories, and automatically in others. All photographs, books, documents and reference works are automatically assigned the precious content attribute, therefore deletion requires user intervention. Users may select individual pages of newspaper, magazine or web site type content for more permanent storage. Users select the precious attribute from the pop-up menu that can be selected with the joystick when that page displayed. Content that is in content bundle format when it is given a precious attribute is copied out of the content bundle in uncompressed format, and saved in the non-volatile storage. This allows content bundles to be deleted as a whole.

In one embodiment, the precious attribute is utilized in conjunction with the automatic disk reuse program 141. This is simply a garbage collection type disk cache cleanup that uses a Least Recently Used (LRU) algorithm to determine when blocks of non-volatile storage 120 are to be deleted for use by new content. The LRU scheme works in conjunction with the content pointer database 140 to identify content that is "stale", or has not been accessed in a user determined amount of time, and that does not have a precious attribute. Content that is, for example, more than one month old (this time period is user selectable for each content type), may be selected for automatic deletion. This will make room for the storage of newer content. Contents are deleted from the content pointer database start point, and down the link tree from there. The link traversal during deletion is facilitated by the link tree created during the initial content write to non-volatile storage. The link tree allows the cleanup utility (LRU) to simply delete a series of files that are known to be part of a particular initial start point, or content type. This reduces or eliminates the possibility of Dead Links left in non-volatile storage. Dead links are pages of WEB content that have no method of being accessed by either a WEB page link, or a content pointer database link. The LRU scheme is made easier with Content Bundles, in that large areas of storage are freed with a single file deletion. Each content type can have different default staleness times, so, for example, a newspaper entry may be stale after three or four days, while a magazine may not become stale for four months. These staleness attributes are also stored in the content pointer database, and are user changeable.

In one embodiment, the Disk Reuse Algorithm (DRA) 141 will only need to run when the Automated Download Utility 137 is also running. The DRA 141 will run just prior and then during automated downloading to free up non-volatile storage space as needed for the content download. As content is removed, the associated content pointer in the content pointer database is also cleared. Any content marked as precious is retained, its content pointer having been created at the time that the content was made precious. Only content that has no content pointer, and is "below" or only referenced by a to-be-deleted content pointer, is removed automatically.

The automatic download utility 137 is a type of wake-up alarm for the device. To update the pad requires an Internet connection present, so it is assumed that the device is either connected (either wired or wirelessly) to the Internet during system storage (overnight for example). At the user-selected time, the automatic download utility 137 will wake up the device (turn on power to system components, except the sound and graphics sub-systems) and initiated a refresh of content from the Internet. The utility 137 will simultaneously run the DRA 141 to free space on the non-volatile storage 120 as needed for content. Deletion of content by the DRA 141 is atomic, i.e. disk space is freed up in increments of content pointer heads, or trees, so chunks are freed at a time, not individual files or bytes.

Picture Viewer Database Application

Figure 12:
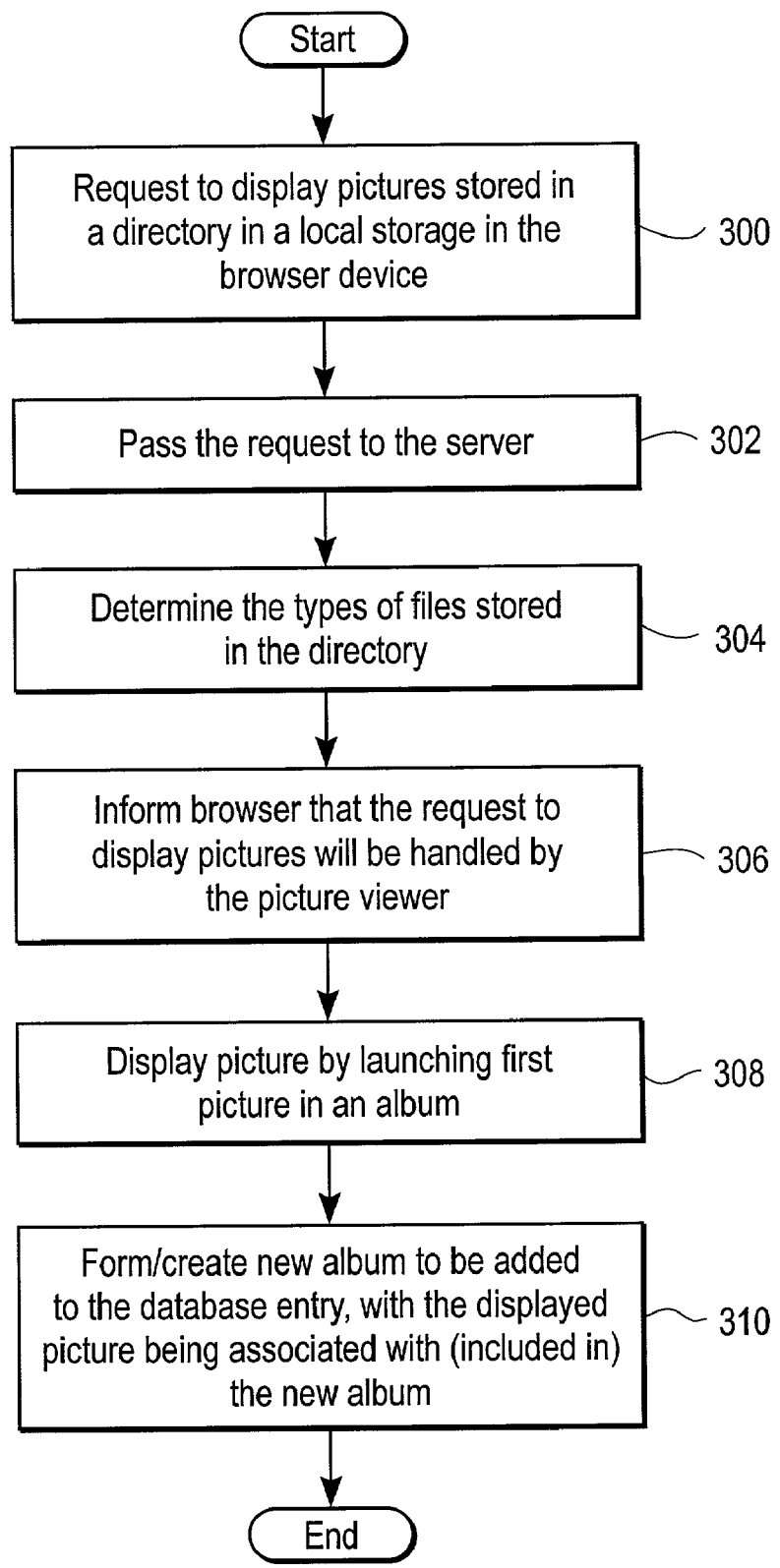
FIG. 12 is a flowchart diagram of a method of displaying and creating pictures in the browser device of FIG. 1.

In some circumstances, the server 136 will perform more than just delivering HTML content pages for viewing on screen 115. For example, in FIG. 12, assume that there is a request (300) from the user to display pictures stored in a directory in the non-volatile storage 120. This request is passed (302) to the server 136. The server 136 then reads the request and then looks into the directory in non-volatile storage 120 to determine (304) the types of files stored in the directory. When the server 136 determines that the files in the directory are all picture files, the server 136 informs (306) the browser 130 that the request will be handled by another application (i.e., the picture viewer 143). Instead of displaying a directory listing using ftp format because the content location in the local hard drive has no HTML files, the server 136 runs a helper application 133 designed to display (308) the pictures in the directory in a user-friendly manner. This resolves several common problems with the typical method of displaying pictures in a browser. Normally, the browser will display a view of the files in the directory, and each picture will be a link which, when selected, displays the picture in the browser. To view the next picture, the user goes back with the browser, and selects the next picture, and so on. This previous technique is cumbersome and impractical for simple picture viewing.

Furthermore, when pictures are stored in the hard drive in the first place, users are forced to create a subdirectory for the storage of the new pictures. This is simply due to the need to organize the pictures in some manner, much like people will save pictures based upon the roll of film that they were originally shot with. Then, to view the digital pictures, the user enters the directory that contains the pictures from that roll of film, and views a slide show of that roll. However, if there are two or more different slides shows that a picture could be included in, the individual picture must be copied to each individual directory, thus duplicating files.

The new digital viewer application 143 will solve both of these problems in a unique and simple manner. All of the pictures stored in the non-volatile storage 120 will remain in a single directory, e.g., a storage place for an entire family's photographs. Viewing of individual pictures happens through user created albums, which are just lists of individual pictures that are to be viewed together, one after the other. The picture location, name and other data are stored in a picture viewer database 144. Each picture, when originally entered into the picture viewer database 144 is assigned the "default" name of the roll of film (or initial event name) that would otherwise correspond to the initial directory for the pictures. This represents the default picture album with which the pictures may be viewed from. Subsequent albums (created by the user to view the same picture from) indicate the second, third, fourth, or more preferred viewing lists for the same picture.

For example, a family takes pictures during a vacation, a birthday party, and a graduation. These pictures are initially placed in the default categories "Family Vacation", "Brianna's Birthday", and "Brianna's Graduation". These default categories become the default album for viewing these pictures. However, all the pictures are placed in one directory together, and their filenames are irrelevant (they could just be the number sequence that the digital camera gave them, e.g.: DSC000191.JPG to DSC000217.JPG). The picture viewer database 144 contains entries for each picture, with default album entries and file name entries filled in. Each database entry contains information about one picture including: original file name, filename in storage cache, Default Album name, Album Name list (with, e.g., storage for 250 album names), file creation date, last file change date. The files for the pictures are not changed or modified in any way, so as to retain their inherent flexibility and portability. Only the database entries are modified, and only by the picture viewer application 143.

Then, assume the family wants to create a new view of the existing pictures in the picture database, this time including only pictures of Brianna. This is handled by creating a new album of all the Brianna pictures. With this method according to an embodiment of the invention, the process is simple, as the default albums are viewed, if a picture looks good for another album, the user selects the New Album menu item, and types in the name of a new album, in this case "Pictures of Brianna". This entry then forms (310) a new album, which is then added to the database entry for each picture that is desired in that album. The pictures themselves are not copied or moved, there is just a new entry in the picture viewer database 144 for that picture that identifies a new album entry in the initial album view.

When viewing the pictures, the application creates a default view that contains the names of all the current albums (customizable in "Default", "Custom" and "All" categories), making each album a link to the start of that albums slide show. If the slide show is interrupted by a menu click (on the scroll button), then a menu pops up allowing the user to place the album in overview mode. This mode shows the album's individual pictures in preview mode, listing as many as can fit on the screen in columns and row format. This then allows the user to drag and drop the pictures into the desired order for that album.

The picture viewer database application 143 initially shows a list of available albums for viewing. When an album is selected, the viewer application 143 launches into the first picture in that album. Pressing the forward or back browser keys will move the picture to the next picture or back. The picture viewer application 143 also enlarges or reduces the picture to the size of the display screen, so that the maximum area of the LCD is used to display each photograph. Since the viewer is designed for use on this peripheral browser device 100, pictures are never rotated, they are displayed in the manner that best fits the screen. That is, a portrait mode picture is never fitted to a landscape mode screen, it is displayed portrait mode, forcing the user to turn the peripheral browser device 100 to view the picture, if necessary. This maximizes the size of every picture, and allows full use of the display screen.

Thus, the picture viewer database application 143 permits the simplified viewing of pictures or digital slide shows for the user of the peripheral browser device 100. The application 143 also allows users to create multiple albums without duplicating files in the local storage 120. The application 143 also simplifies the naming requirements of files, and can automatically rename files that have duplicate file names without user intervention. The application 143 also allows the storage of files with the minimum amount of storage space.

HDTV Connection

An embodiment of the present invention also may advantageously avoid the necessity of setting up an Internet Service Provider (ISP) account. In the high-definition television (HDTV) frequency spectrum, bandwidth has been allocated by the U.S. Federal government to broadcast stations across the country. As known to those skilled in the art, HDTV is a digital form of transmitting television images, which results in a higher resolution and cleaner picture than current televisions based on the National Television Standards Committee (NTSC) standard. However, this new standard requires significantly more bandwidth than regular television, thus resulting in the allocation of new spectrum to the television stations, specifically for use in HDTV transmission. This allocated bandwidth is not being used fully by the broadcast stations because of the lack of viewers, which in turn is due, in part, to the high cost of the television sets that are required. HDTV broadcasting represents a significant cost to televisions stations, and the poor adoption rate leaves them little chance of revenue generation to recoup these start-up costs, as advertisers pay advertising fees based on the number of viewers. This means that HDTV broadcasting stations could benefit from other methods of revenue generation from the allocated bandwidth.

Data casting may be used to take advantage of the unused allocated bandwidth for HDTV. As known to those skilled in the art, data casting involves the transmission of various kinds of data as a secondary service on digital broadcasting networks. The data can be information, interactive multimedia (including video), or Internet content.

Figure 13:
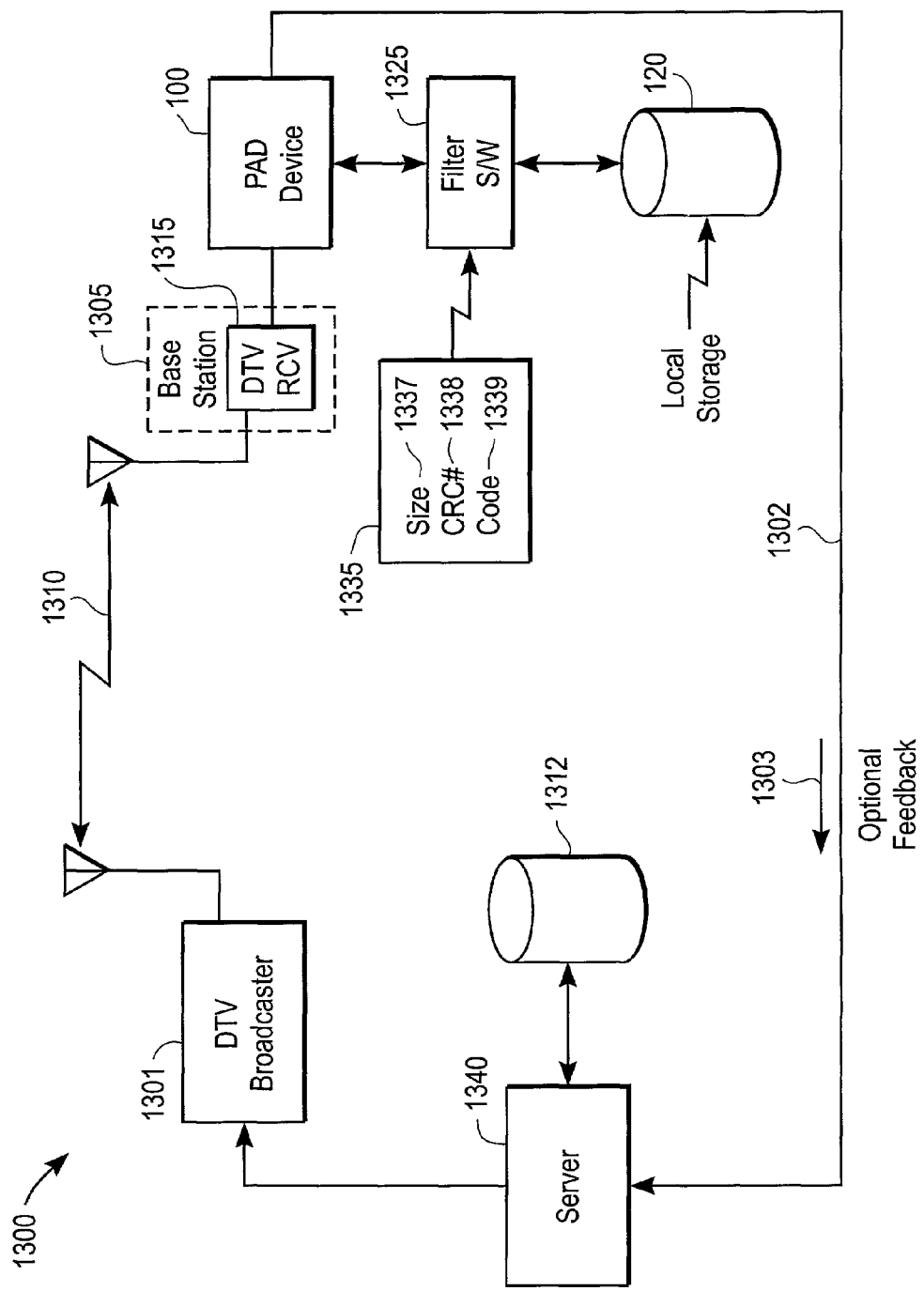
FIG. 13 is a block diagram of a data casting system according to an embodiment of the invention.

Data casting on the unused portions of the HDTV spectrum of any one particular channel permits the transmission of up to approximately 75 gigabytes of data per day. Referring now to FIG. 13, there is shown a data casting transmission system 1300 in accordance with an embodiment of the invention. The peripheral browser device 100 has an optional base station 1305 that accepts Internet content from the HDTV signal 1310, for storage in the non-volatile storage 120. In essence, the HDTV receiver 1315 in the base station 1305 becomes a one-way Internet connection.

As content is broadcast, the peripheral browser device 100 filters the received content, by use of filter software (filtering engine) 1325, placing only the content bundles that the user has requested into non-volatile storage 120.

Filtering is handled by downloading the content continuously as it is broadcast. At the start of each content bundle, a header 1335 describes, in one embodiment, the content 1336, the completed size 1337 of the bundle, a Cyclic Redundancy Check (CRC) number 1338, and a content bundle date code 1339. This header 1335 is used to determine the suitability of the is content for that particular user. If the content is not required, the content is allowed to pass. If the content is requested by the user, and the content is newer than the content stored in non-volatile storage 120, then the content is copied in its entirety to the non-volatile storage 120 of the peripheral browser device 100.

The data cast transmission is transmitted from a broadcaster transmitter 1301. An optional feedback line 1302 may be made available to permit the user of the browser device 100 to send feedback information 1303 to a server 1340 that is controlled by a broadcaster. This information 1303 may be, for example, usage history of a user's navigation through the content bundle, including information on advertisements viewed, and articles read. This information 1303 is then used to tailor advertising in the future content. The server 1340 can access this database 1312 for various information.

This embodiment allows HDTV broadcasters to benefit by selling content distribution to traditional print media. This distribution can augment or replace traditional printing and delivery (mailing) methods, thus reducing the overall cost of distributing content to end-users.

It is also within the scope of the present invention to implement a program or code that can be stored in an electronically-readable medium to permit a computer to perform any of the methods described above.

Further, at least some of the components of this invention may be implemented by using a programmed general-purpose digital computer, by using application specific integrated circuits or field programmable gate arrays, or by using a network of interconnected components and circuits. Connections may be wired, wireless, by modem, and the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be it determined entirely by the following claims, which are to be construed in accordance with established doctrines of claim interpretation.

What is claimed is:

1. A portable apparatus comprising:
    a non-volatile storage medium capable to store digital content from a data communication network, wherein the digital content comprises a first digital content and a second digital content, the first digital content including a link to the second digital content;
    a display communicatively coupled to the non-volatile storage medium, wherein the display is operable to display images of the digital content subsequent to downloading and storing the digital content, and wherein the display is operable to render the digital content using a web browser regardless of whether the portable apparatus is coupled to the data communication network; and
    a processor, communicatively coupled to the non-volatile storage medium, the processor operable to execute instructions causing the processor to:
    receive a data cast transmission including content bundles, wherein the data cast transmission is a high definition television (HDTV) transmission, and wherein the content bundles are received on unused portions of the HDTV transmission, wherein the content bundles comprise at least selected content bundles requested by a user and secondary service data;
    filter the received content bundles so that the selected content bundles are stored in a portable non-volatile storage and the secondary service data are blocked; and
    display at least some of the stored content bundles, wherein the stored content bundles are displayed using the web browser on the display.

2. The portable apparatus of claim 1, wherein the data communications network includes the Internet.

3. The portable apparatus of claim 1, wherein the digital content includes data relating to any one of a website, an electronic document, a digital photograph, multimedia content, or digital music.

4. The portable apparatus of claim 1, wherein the digital content is stored in the non-volatile storage medium as a content bundle.

5. The portable apparatus of claim 1, wherein the non-volatile storage medium is flash memory.

6. The portable apparatus of claim 1, the portable apparatus further comprising a touch screen to receive user input.

7. The portable apparatus of claim 1, wherein the display is operable to increase a size of a client window for the web browser.

8. The portable apparatus of claim 1, wherein the portable apparatus is communicatively coupled to a host processing device and wherein the digital content is downloaded to the non-volatile storage medium in response to print commands issued in the host processing device.

9. The portable apparatus of claim 1, wherein the portable apparatus is communicatively coupled to a host processing device and wherein the processor is operable to perform a first operation in response to a command from a first user and the host processing device is capable to perform a second task in response to a command from a second user.

10. The portable apparatus of claim 1, wherein the processor is operable to sustain the rendition of the web browser during an operation of the portable apparatus so that a client window of the web browser remains on display during the operation of the portable apparatus.

11. The portable apparatus of claim 1, wherein a helper engine is operable to assist the web browser in decoding the digital content.

12. The portable apparatus of claim 1, wherein the link is a hyperlink.

13. The portable apparatus of claim 1, wherein the digital content comprises a website, the first digital content comprises a first webpage associated with the website and the second digital content comprises a second webpage associated with the website, and wherein a particular depth of content from the website is stored in the non-volatile storage medium.

14. A method of receiving data cast transmission, the method comprising:
   receiving, at a client computer, a data cast transmission including content bundles, wherein the data cast transmission is a high definition television (HDTV) transmission, and wherein the content bundles are received on unused portions of the HDTV transmission, wherein the content bundles comprise at least selected content bundles requested by a user and secondary service data;
   filtering the received content bundles so that the selected content bundles are stored in a portable non-volatile storage and the secondary service data are blocked; and
   displaying at least some of the stored content bundles, wherein the stored content bundles are displayed using a web browser on a peripheral browsing device coupled to the portable non-volatile storage.

15. The method of claim 14, further comprising:
   transmitting feedback information to a broadcaster of content bundles in response to receiving the selected bundles.

16. A non-transitory computer-readable storage medium storing an executable program that instructs one or more processors to perform the following operations:
   receive a data cast transmission including content bundles, wherein the data cast transmission is a high definition television (HDTV) transmission, and wherein the content bundles are received on unused portions of the HDTV transmission, wherein the content bundles comprise at least selected content bundles requested by a user and secondary service data;
   filter the received content bundles so that the selected content bundles are stored in a portable non-volatile storage and the secondary service data are blocked; and
   display at least some of the stored content bundles, wherein the stored content bundles are displayed using a web browser on a peripheral browsing device coupled to the portable non-volatile storage.

17. The non-transitory computer-readable storage medium of claim 16, wherein the portable non-volatile storage medium is flash memory.

18. The non-transitory computer-readable storage medium of claim 16, wherein the executable program further instructs the one or more processors to transmit feedback information to a broadcaster of content bundles in response to receiving the selected bundles.

19. The non-transitory computer-readable storage medium of claim 16, wherein the feedback information includes a usage history recording advertisements that a user has viewed.

20. The non-transitory computer-readable storage medium of claim 18, wherein the peripheral browsing device is coupled to an HDTV receiver capable of accepting Internet content from the HDTV transmission.

21. The non-transitory computer-readable storage medium of claim 18, wherein the peripheral browsing device includes a touch screen to receive user input.

* * * * *